(12) United States Patent
Rozman et al.

(10) Patent No.: US 8,427,092 B2
(45) Date of Patent: Apr. 23, 2013

(54) HIGH VOLTAGE DC ELECTRIC POWER GENERATING SYSTEM WITH PERMANENT MAGNET GENERATOR PROTECTION

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 368 days.

(21) Appl. No.: 12/906,824

(22) Filed: Oct. 18, 2010

(65) Prior Publication Data

US 2012/0091939 A1    Apr. 19, 2012

(51) Int. Cl.
*H02P 7/14* (2006.01)
(52) U.S. Cl.
USPC ....... 318/504; 318/400.26; 318/722; 318/724
(58) Field of Classification Search ............. 318/400.26, 318/400.27, 722, 724, 504, 563, 434, 490; 388/903
See application file for complete search history.

(56) References Cited

U.S. PATENT DOCUMENTS

| | | | |
|---|---|---|---|
| 5,675,222 A * | 10/1997 | Fliege | 318/139 |
| 6,297,573 B1 * | 10/2001 | Roth-Stielow et al. | 310/68 C |
| 6,577,086 B2 | 6/2003 | Sebastian | |
| 6,965,206 B2 * | 11/2005 | Kamen et al. | 318/139 |
| 7,157,875 B2 * | 1/2007 | Kamen et al. | 318/434 |
| 7,276,871 B2 * | 10/2007 | Ganev et al. | 318/434 |
| 8,063,596 B2 * | 11/2011 | Imura | 318/400.09 |
| 2004/0100149 A1 | 5/2004 | Lai | |
| 2011/0181219 A1 | 7/2011 | Liegeois et al. | |

OTHER PUBLICATIONS

The extended European Search Report for counterpart European application No. 11189815.1 filed Nov. 18, 2011.
Yamanaka, M. et al. "Practical Development of a High-Performance UPS with a Novel Buck-Boost Chopper Circuit." Telecommunications Energy Conference, Sep. 10, 2000. IEEE, pp. 632-637.

* cited by examiner

*Primary Examiner* — Bentsu Ro
*Assistant Examiner* — Thai Dinh
(74) *Attorney, Agent, or Firm* — Kinney & Large, P.A.

(57) ABSTRACT

A permanent magnet generator system provides protection from fault conditions. The system includes a permanent magnet generator having a first, second, and third winding wherein each winding has a first end and a second end. During the normal mode of operation, the first ends of the windings are shorted to a first neutral point and alternating current (AC) voltage developed in the first, second and third windings is provided to a primary output associated with the second ends of the windings. In response to a fault condition on the primary output side of the system, the second ends of the windings are shorted together to a second neutral point and the first ends of the windings are disconnected from the first neutral point. During the backup mode, AC voltage developed in the windings is provided to a secondary output associated with the first ends of the windings.

20 Claims, 2 Drawing Sheets

HIGH VOLTAGE DC ELECTRIC POWER GENERATING SYSTEM WITH PERMANENT MAGNET GENERATOR PROTECTION

BACKGROUND

The present invention is related to permanent magnet generators, and in particular to permanent magnet generators that provide protection from short-circuit conditions.

Permanent magnet generators (PMGs) are a special type of generator that relies on permanent magnets to generate the magnetic field(s) necessary to operate the generator. This is in contrast with other types of generators, which typically employ an excitation current to generate the desired magnetic field. While PMGs outperform more traditional motors and generators in many applications, one of the benefits of more traditional systems is the ability to quickly remove excitation and therefore the presence of the magnetic field in the event of a fault condition. Because the magnetic field in PMGs is generated by permanent magnets, there is no mechanism for shutting down the machine quickly in the event of a fault. For example, in response to a short-circuit condition in a permanent magnet generator (PMG), the generator will continue providing a voltage until the rotating portion of the generator comes to rest. During this time the short-circuit fault may cause considerable damage to the PMG.

SUMMARY

An electric power generation system includes a permanent magnet generator (PMG) having at least one permanent magnet and a first winding, a second winding, and a third winding for developing and alternating current (AC) voltage in response to a magnetic field provided by the at least one permanent magnet. The first winding, the second winding and the third winding each have a first end and a second end. A primary output is connected to the second ends of the first, second and third windings to receive AC voltage developed in those windings during a normal mode of operation. A secondary output is connected to the first ends of the first, second and third windings to receive AC voltage developed in those windings during a backup mode of operation. The system further includes a first pair of contactors and a second pair of contactors. The first pair of contactors include a first contactor connected between the first end of the first winding and the first end of the second winding, and a second contactor connected between the first end of the second winding and the first end of the third winding. The second pair of contactors include a third contactor connected between the second end of the first winding and the second end of the second winding, and a fourth contactor connected between the second end of the second winding and the second end of the third winding. During the normal mode of operation the first pair of contactors are closed to connect the first ends of the first, second and third windings to a first neutral point, and the second pair of contactors are opened to supply the AC voltage developed in the first, second and third windings to the primary output. During the backup mode of operation the second pair of contactors are closed to connect the second ends of the first, second and third windings to a second neutral point, and the first pair of contactors are opened to supply the AC voltage developed in the first, second and third windings to the secondary output.

DETAILED DESCRIPTION

The present invention provides a permanent magnet generator (PMG) system with fault protection. In particular, the PMG system is configured to operate in one of two modes of operation. In the first mode of operation (i.e., normal mode), the windings of the PMG have a first end shorted together to a first neutral point and a second end connected to supply AC power to a primary converter. In response to a detected fault on the primary converter side, the second ends of the windings are shorted together to a second neutral point. In addition, the first ends of the windings are disconnected from the second neutral point such that voltage developed in the windings is supplied to the secondary converter. The PMG is therefore able to continue to supply power even after the detected fault.

Figure 1:
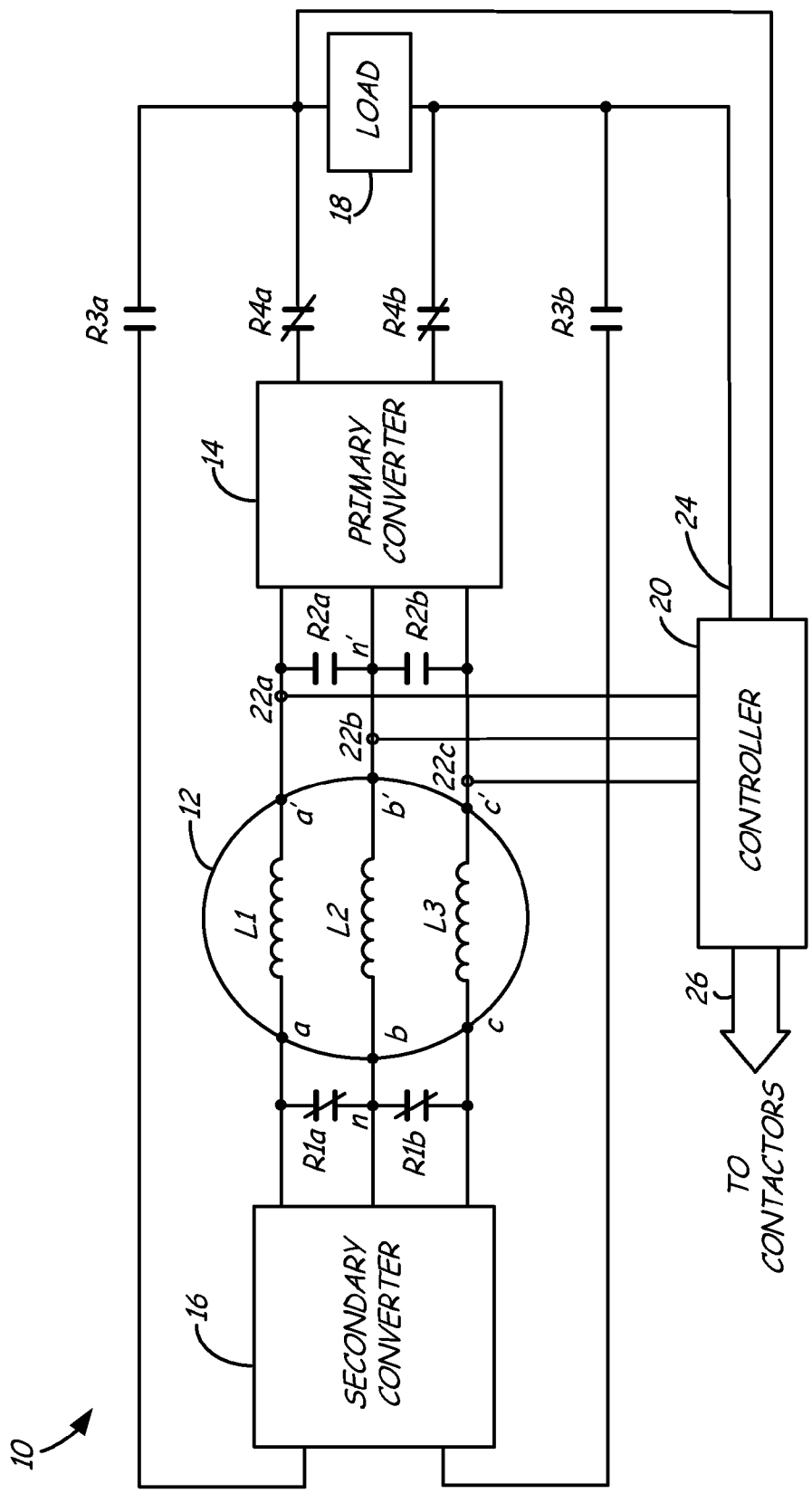
FIG. 1 is a block diagram of a permanent magnet generator (PMG) system according to an embodiment of the present invention.

FIG. 1 is a block diagram of permanent magnet generator (PMG) and protection system 10 according to an embodiment of the present invention. PMG system 10 includes PMG 12 having windings L1, L2 and L3, primary converter 14, secondary converter 16, controller 20, and contactors R1a, R1b, R2a, R2b, R3a, R3b, R4a and R4b (collectively, "the contactors"). Windings L1, L2 and L3 each have a first end with phases labeled a, b, and c and a second end with phases labeled a', b', and c'. PMG system 10 operates in one of two modes of operation, a normal mode in which voltage developed by PMG 12 is provided to primary converter 14, and a secondary mode in which power developed by PMG 12 is provided to secondary converter 16. The modes of operation are selectively controlled by controller 20, which provides control signals 26 to selectively open and close the contactors. In this way, a fault in the primary converter 14 can be mitigated by supplying power through secondary converter 16 to load 18. In addition, the present invention mitigates the damage that may otherwise result in PMG system 10 from a short circuit by directing voltage that otherwise would have been provided to primary converter 14 to secondary converter 16 for supply to load 18. In the embodiment provided in FIG. 1, three-phase alternating current (AC) voltage developed in the windings of PMG 12 is converted to a direct current (DC) voltage for supply to load 18. In other embodiments, it may not be necessary to convert the generated AC voltage to a DC voltage for supply to load 18, or it may be necessary to include additional converters to convert the DC voltage to a desired form or magnitude.

Controller 20 dictates the mode of operation by controlling the respective states of the contactors R1a, R1b, R2a, R2b, R3a, R3b, R4a and R4b. The following table illustrates the state (open or closed) of each contactor to implement the desired mode of operation.

TABLE 1

|  | R1a, R1b | R2a, R2b | R3a, R3b | R4a, R4b |
| --- | --- | --- | --- | --- |
| Normal Mode (Power supplied via primary converter 14) | Closed | Opened | Opened | Closed |
| Fault Mode (Power supplied via secondary converter 16) | Opened | Closed | Closed | Opened |

During normal operation, contactors R1a and R1b are closed to connect the first ends a, b, and c of windings L1, L2 and L3, respectively, to neutral point n. Contactors R2a and R2b remain open such that voltage developed in windings L1, L2, and L3 of PMG 12 are provided to primary converter 14. In the embodiment provided in FIG. 1, primary converter 14 acts to convert the alternating current (AC) voltage to a direct-current (DC) voltage that is supplied via closed contactors R4a and R4b to load 18. Contactors R3a and R3b remain open to isolate secondary converter 16 from load 18. Contactors R1a, R1b, R4a, and R4b are shown in FIG. 1 as normally-closed contactors and contactors R2a, R2b, R3a and R3b are shown as normally-opened contactors. In other embodiments the contactors may be of either the normally-closed or normally-opened variety depending on the application. Furthermore, other well-known devices for making/breaking electrical connections may be employed in place of traditional contactors, including solid-state switching devices (SSSDs).

Controller 20 monitors the current in windings L1, L2 and L3 of PMG 12 via current sensors 22a, 22b, and 22c. In the embodiment shown in FIG. 1, the current through each winding is monitored individually via separate current sensors. In other embodiments, the current through windings L1, L2 and L3 are collectively monitored by a single current sensor. In still other embodiments, faults on the primary converter side of PMG system 10 are detected by monitoring the DC bus voltage via voltage sense 24. In response to a detected fault condition (e.g., short-circuit) on the primary converter side of PMG system 10, controller 20 transitions the operating mode of PMG system 10 from the normal operating mode to a backup or fault mode. In the backup mode, contactors R1a, R1b, R4a, and R4b are opened, and contactors R2a, R2b, R3a, and R3b are closed. Closing contactors R2a and R2b connects the second ends a', b', and c' of windings L1, L2 and L3, respectively, to second neutral point n'. In this way, voltages developed in windings L1, L2, and L3 of PMG 12 are no longer supplied to primary converter 14. Opening relay contactors R1a and R1b disconnects first ends a, b, and c of windings L1, L2 and L3, respectively, from first neutral point n. As a result, voltage developed on windings L1, L2 and L3 is supplied to secondary converter 16 instead of primary converter 14. Secondary converter 16 converts the received AC voltage to a DC voltage for provision to load 18.

In the embodiment shown in FIG. 1, safe transition from the normal mode of operation to the backup mode of operation requires the contactors to be opened and closed in a safe sequence. In particular, contactors R2a and R2b are closed to isolate PMG 12 from the detected fault before contactors R1a and R1b are opened to provide the voltage developed by windings L1, L2 and L3 to secondary converter 16. Likewise, contactors R4a and R4b are opened to disconnect load 18 from the detected fault prior to closing contactors R3a and R3b to deliver power from secondary converter 16 to load 18.

In response to a detected short-circuit failure within PMG 12, the failure cannot be corrected by transitioning power from primary converter 14 to secondary converter 16. Therefore, during a short-circuit fault within PMG 12, whether during the normal mode of operation or during the backup mode of operation, controller 20 causes contactors R1a, R1b, R2a and R2b to open to essentially remove the neutral point of PMG 12. Although still connected to primary converter 14 and secondary converter 16, without a common neutral there is no return path for the circuit and even though PMG 12 continues to develop voltage across windings L1, L2 and L3 there is no current developed in either primary converter 14 or secondary converter 16. In this way, the short-circuit fault is isolated within PMG 12 and cannot damage other components connected to PMG 12.

Figure 2:
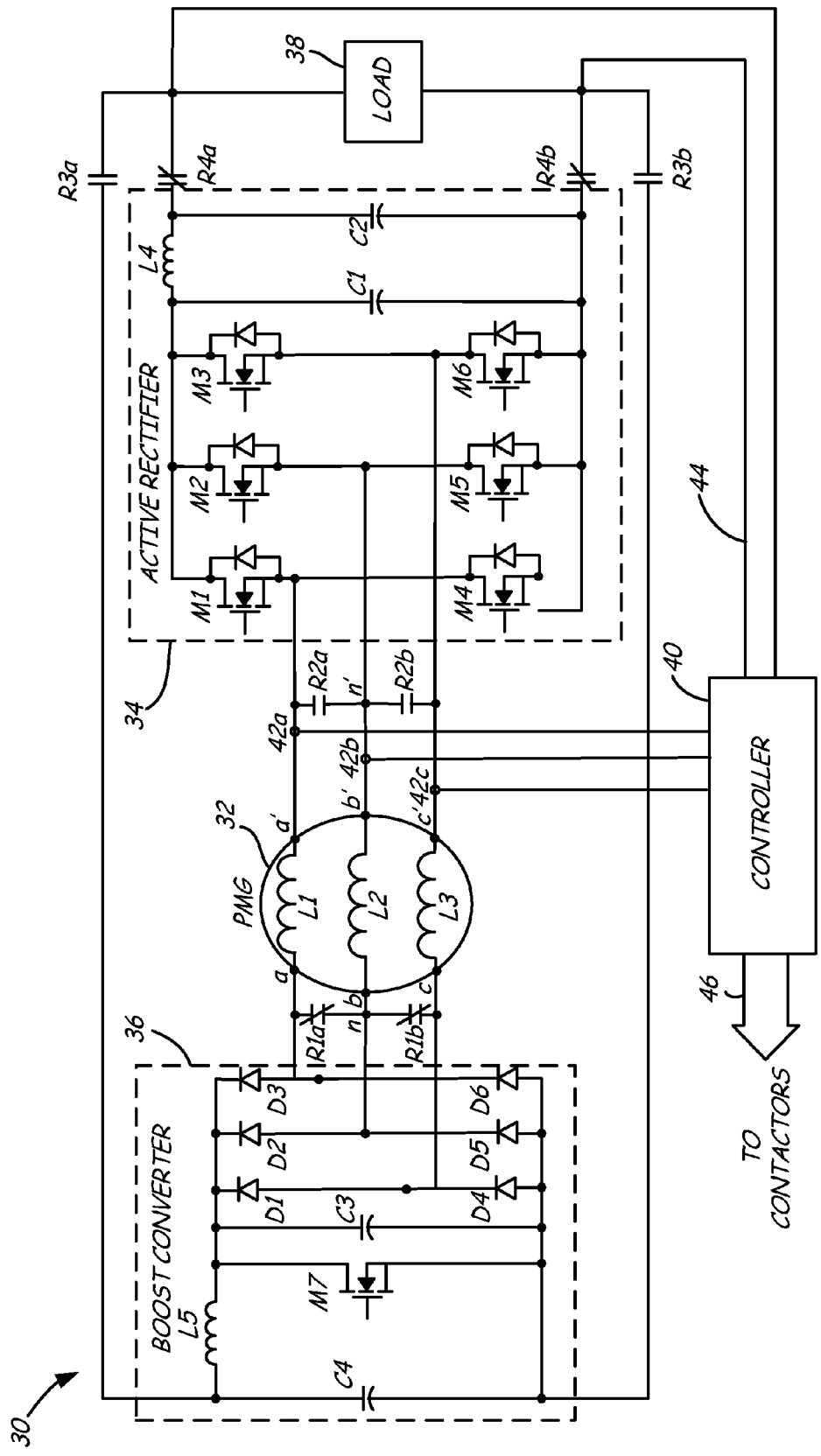
FIG. 2 is a block/circuit diagram of a permanent magnet generator (PMG) system providing additional details according to an embodiment of the present invention.

FIG. 2 is a block/circuit diagram of permanent magnet generator (PMG) system 30 according to an embodiment of the present invention. In particular, in the embodiment shown in FIG. 2 provides additional details regarding a particular implementation of primary converter 34 and secondary converter 36.

Once again, PMG 32 includes windings L1, L2, and L3, each having a first end a, b, and c and a second end a', b', and c'. Controller 40 selectively opens and closes contactors R1a, R1b, R2a, R2b, R3a, R3b, R4a and R4b to operate PMG system 30 in either a normal mode of operation or a backup mode of operation. In one embodiment, controller 40 monitors the current in PMG windings L1, L2, and L3 via current sensors 42a, 42b and 42c to detect fault conditions. In another embodiment, controller 40 monitors the DC bus voltage via voltage sense 44 to detect fault conditions. Controller 40 may employ one or more fault detection techniques to determine whether PMG system 30 should be operated in the normal mode of operation or the backup mode of operation.

During the normal mode of operation, controller 40 closes contactors R1a and R1b to connect the first ends a, b, and c of windings L1, L2 and L3, respectively, to first neutral point n. Contactors R2a and R2b are opened such that voltage developed in windings L1, L2 and L3 is provided to primary converter 34. In the embodiment shown in FIG. 2, primary converter 34 is an active rectifier that includes six solid-state switches M1-M6 that are selectively turned On and Off to convert the AC voltage provided by windings L1, L2 and L3 to a DC voltage for provision to load 38. DC link capacitor C1, filter capacitor C2 and filter inductor L4 act to smooth out the DC waveform provided to load 38. Solid-state switches M1-M6 may be implemented with power metal-oxide semi-conductor transistors (MOSFETs), bipolar junction transistor (BJTs) or other well-known solid-state devices.

Potential fault conditions in primary converter 34 that require transitioning from the normal mode of operation to the backup mode of operation include failures in one or more of the solid-state switches M1-M6, in the dc link capacitor C1, filter capacitor C2, or filter inductor L4.

In response to a detected fault condition, PMG system 30 is transitioned from a normal operating mode to a backup operating mode. As discussed with respect to FIG. 1, contactors R1a, R1b, R4a and R4b are opened, and contactors R2a, R2b, R3a, and R3b are closed. Closing contactors R2a and R2b connects second ends a', b', and c' of PMG 32 to second neutral point n', and opening contactors R1a and R1b disconnects first ends a, b, and c from first neutral point n such that voltage developed in windings L1, L2 and L3 is supplied to secondary converter 36. In the embodiment shown in FIG. 2, secondary converter 36 is a boost converter that includes diodes D1-D6, DC link capacitor C3, filter capacitor C4, filter inductor L5, and solid-state switch M7. Diodes D1-D6 act to rectify the AC voltage provided by PMG 32, and solid-state switch M7 is selectively turned On and Off to regulate the magnitude of the DC voltage provided by the boost converter to load 38.

In other embodiments, instead of a boost converter an additional active rectifier may be employed to provide the desired voltage to load 38. However, a benefit of employing the boost converter is it is generally less expensive than an active rectifier, and as a backup device only used during failures of primary converter 34 does not need to provide the same level of energy efficiency so long as the full power requirements of load 38 are met.

In response to a detected short-circuit failure within PMG 32, whether during the normal mode of operation or during the backup mode of operation, contactors R1a, R1b, R2a and R2b are opened to disconnect PMG 32 from both primary converter 34 and secondary converter 36.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric power generation system comprising:
   a permanent magnet generator (PMG) having at least one permanent magnet and a first winding, a second winding, and a third winding for developing and alternating current (AC) voltage in response to a magnetic field provided by the at least one permanent magnet, the first winding, the second winding and the third winding each have a first end and a second end;
   a primary output connected to the second end of the first, second and third windings to receive the AC voltage developed in the first, second, and third windings of the PMG during a normal mode of operation;
   a secondary output connected to the first end of the first, second and third windings to receive the AC voltage developed in the first, second, and third windings of the PMG during a backup mode of operation;
   a first pair of contactors including a first contactor connected between the first end of the first winding and the first end of the second winding, and a second contactor connected between the first end of the second winding and the first end of the third winding;
   a second pair of contactors including a third contactor connected between the second end of the first winding and the second end of the second winding, and a fourth contactor connected between the second end of the second winding and the second end of the third winding;
   a controller for selectively operating the PMG system in either a normal mode or operation or a backup mode of operation, wherein during the normal mode of operation the controller closes the first pair of contactors to connect the first ends of the first, second and third windings to a first neutral point, and opens the second pair of contactors to supply the AC voltage developed in the first, second and third windings to the primary output; and
   wherein during the backup mode of operation the controller closes the second pair of contactors to connect the second ends of the first, second and third windings to a second neutral point, and opens the first pair of contactors to supply the AC voltage developed in the first, second and third windings to the secondary output.

2. The system of claim 1, further including:
   a primary converter connectable to the primary output for converting the AC voltage developed in the first winding, the second winding, and the third winding to a direct-current (DC) voltage;
   a secondary converter connectable to the secondary output for converting the AC voltage developed in the first winding, the second winding, and the third winding to a DC voltage;
   a third pair of contactors connectable between a DC output of the primary converter and a load, wherein the controller closes the third pair of contactors during normal operation to supply the DC output provided by the primary converter to the load and opens the third pair of contactors during backup operations to disconnect the primary converter from the load; and
   a fourth pair of contactors connectable between a DC output of the secondary converter and the load, wherein the controller opens the fourth pair of contactors during normal operation to disconnect the secondary converter from the load and closes the fourth pair of contactors during backup operation to supply the DC output provided by the primary converter to the load.

3. The system of claim 2, wherein the primary converter is an active rectifier for converting the AC voltage developed by the first winding, the second winding, and the third winding to the DC voltage.

4. The system of claim 3, wherein the active rectifier includes:
   a first pair of solid-state switches connectable to receive the AC voltage developed by the first winding;
   a second pair of solid-state switches connectable to receive the AC voltage developed by the second winding; and
   a third pair of solid-state switches connectable to receive the AC voltage developed by the third winding, wherein the first, second and third pair of solid-state switches are selectively turned On and Off to convert the AC voltage developed in the first, second and third windings to the DC voltage during the normal mode of operation.

5. The system of claim 2, wherein the secondary converter is a boost converter for converting the AC voltage developed by the first winding, the second winding, and the third winding to the DC voltage.

6. The system of claim 5, wherein the boost converter includes:
   a first pair of diodes connectable to rectify the AC voltage developed by the first winding;
   a second pair of diodes connectable to rectify the AC voltage developed by the second winding;
   a third pair of diodes connectable to rectify the AC voltage developed by the third winding;
   a solid-state switch connected to the output of the first, second and third pair of diodes that is selectively turned On and Off to regulate the DC voltage provided to the load during the backup mode of operation.

7. The system of claim 2, wherein the controller monitors the DC output voltage provided by the primary converter to detect fault conditions that require transitioning form the normal mode of operation to the backup mode of operation.

8. The system of claim 1, wherein the controller monitors current through at least one of the first, second and third windings to detect fault conditions that require transitioning form the normal mode of operation to the backup mode of operation.

9. A method of operating a permanent magnet generator system that includes a permanent magnet generator having a first, second and third winding, each winding having a first and second end, the method comprising:
   operating in a normal mode of operation in which a first pair of contactors is closed to connect the first ends of the first, second and third windings to a first neutral point, wherein alternating current (AC) voltage developed on the first, second and third windings is provided via the second ends of the first, second and third windings to a primary output; and operating in a backup mode of operation in response to a detected fault condition in which a second pair of contactors is closed to connect the second ends of the first, second and third windings to a second neutral point and the first pair of contactors is opened, wherein voltage developed on the first, second and third windings is provided via the first ends of the first, second and third windings to a secondary output.

10. The method of claim 9, wherein the permanent magnet generator system includes a primary converter connected to the second ends of the first, second and third windings and a secondary converter connected to the first ends of the first, second and third windings, wherein operating in a normal mode of operation further includes:
converting the AC voltage developed in the first, second and third windings to a DC voltage with the primary converter connected to the second ends of the first, second and third windings;
maintaining a third pair of contactors connected between the secondary converter and a load in an opened state; and
maintaining a fourth pair of contactors connected between the primary converter and a load in a closed state to supply the DC voltage provided by the primary converter to the load.

11. The method of claim 10, wherein operating in a backup mode of operation further includes:
converting the AC voltage developed in the first, second and third windings to a DC voltage with the secondary converter connected to the first ends of the first, second and third windings;
maintaining the third pair of contactors connected between the secondary converter and the load in a closed state to supply the DC voltage provided by the secondary converter to the load; and
maintaining the fourth pair of contactors connected between the primary converter and the load in an opened state.

12. The method of claim 10, further including:
monitoring the DC voltage provided by the primary converter to detect a fault condition that requires transitioning form the normal mode of operation to the backup mode of operation.

13. The method of claim 9, further including:
monitoring current through at least one of the first, second and third windings to detect a fault condition that require transitioning form the normal mode of operation to the backup mode of operation.

14. A high-voltage direct-current (DC) electric power generating system comprising:
a permanent magnet generator (PMG) having at least one permanent magnet and a first winding, a second winding, and a third winding for developing and alternating current (AC) voltage in response to a magnetic field provided by the at least one permanent magnet, the first winding, the second winding and the third winding each have a first end and a second end;
a primary converter connected to the second end of the first, second and third windings that converts the AC voltage developed in the first, second and third windings to a direct-current (DC) voltage during a normal mode of operation;
a secondary converter connectable to the first end of the first, second and third windings that converts the AC voltage developed in the first, second and third windings to a DC output voltage provided during a backup mode of operation;
a first pair of contactors including a first contactor connected between the first end of the first winding and the first end of the second winding, and a second contactor connected between the first end of the second winding and the first end of the third winding;
a second pair of contactors including a third contactor connected between the second end of the first winding and the second end of the second winding, and a fourth contactor connected between the second end of the second winding and the second end of the third winding;
a third pair of contactors including a fifth and sixth contactor connected between the DC output voltage of the secondary converter and a load;
a fourth pair of contactors including a seventh and eight contactor connected between the DC output of the primary converter and a load;
a controller for selectively operating the system in either a normal mode or operation or a backup mode of operation, wherein during the normal mode of operation, the controller closes the first and fourth pair of contactors and opens the second and third pair of contactors such that AC voltage developed on the first, second and third windings is provided to the primary converter and the DC output voltage of the primary converter is provided to the load; and
wherein during a backup mode of operation, the controller opens the first and fourth pair of contactors and closes the second and third pair of contactors such that AC voltage developed on the first, second and third windings is provided to the secondary converter and the DC output voltage of the secondary converter is provided to the load.

15. The system of claim 14, wherein the primary converter is an active rectifier.

16. The system of claim 14, wherein the secondary converter is a boost converter.

17. The system of claim 14, wherein the system is transitioned from the normal operating mode to the backup operating mode in response to a fault detected in the primary converter.

18. The system of claim 17, wherein during the transition from the normal operating mode to the backup operating mode the controller closes the second pair of contactors before opening the first pair of contactors.

19. The system of claim 14, wherein the controller monitors current through at least one of the first, second and third windings to detect fault conditions that require transitioning form the normal mode of operation to the backup mode of operation.

20. The system of claim 14, wherein the controller monitors the DC output voltage to detect fault conditions that require transitioning form the normal mode of operation to the backup mode of operation.

* * * * *